United States Patent
Dong et al.

(10) Patent No.: US 8,476,880 B2
(45) Date of Patent: Jul. 2, 2013

(54) SYSTEM AND METHOD FOR REDUCING OUTPUT VOLTAGE OF A POWER REGULATOR UNDER LIGHT LOAD

(75) Inventors: Wei Dong, Cary, NC (US); Xiao Xu, Cary, NC (US); Wenkai Wu, East Greenwich, RI (US)

(73) Assignee: Texas Instruments Incorporated, Dallas, TX (US)

( * ) Notice: Subject to any disclaimer, the term of this patent is extended or adjusted under 35 U.S.C. 154(b) by 278 days.

(21) Appl. No.: 12/859,575

(22) Filed: Aug. 19, 2010

(65) Prior Publication Data

US 2012/0043946 A1    Feb. 23, 2012

(51) Int. Cl.
*G05F 1/573* (2006.01)

(52) U.S. Cl.
USPC ............ 323/277; 323/281; 323/284; 323/285

(58) Field of Classification Search
USPC ................ 323/266, 274, 277, 281, 282, 284, 323/285
See application file for complete search history.

(56) References Cited

U.S. PATENT DOCUMENTS

| | | | |
|---|---|---|---|
| 6,438,007 B1 * | 8/2002 | Pilukaitis et al. ............... | 363/65 |
| 6,472,856 B2 * | 10/2002 | Groom et al. ................. | 323/284 |
| 6,661,214 B1 | 12/2003 | Hann et al. | |
| 7,446,520 B2 * | 11/2008 | Hung ............................ | 323/288 |
| 7,474,879 B2 | 1/2009 | Turner et al. | |
| 7,557,551 B1 * | 7/2009 | Somerville et al. ........... | 323/282 |
| 7,772,811 B1 * | 8/2010 | Jain et al. ...................... | 323/224 |
| 2004/0165328 A1 | 8/2004 | Kumar et al. | |
| 2007/0024252 A1 * | 2/2007 | Marino et al. ................ | 323/222 |
| 2007/0285299 A1 | 12/2007 | Krishnan et al. | |
| 2010/0327832 A1 * | 12/2010 | Nishida ......................... | 323/282 |

FOREIGN PATENT DOCUMENTS

WO  WO 2004/023637 A1  3/2004

* cited by examiner

*Primary Examiner* — Adolf Berhane
*Assistant Examiner* — Lakaisha Jackson
(74) *Attorney, Agent, or Firm* — William B. Kempler; Wade J. Brady, III; Frederick J. Telecky, Jr.

(57) ABSTRACT

One embodiment of the invention includes regulation voltage system for a power supply system. The system includes a current sense system configured to generate a sense signal that represents an output current of the power supply system that is supplied to a load. The system also includes a positive voltage droop controller configured to provide a regulation voltage to the power supply system, the positive voltage droop controller setting the regulation voltage to one of a predetermined fixed reference voltage or a variable reference voltage based on the sense signal. The variable reference voltage can be less than the predetermined fixed reference voltage.

17 Claims, 3 Drawing Sheets

SYSTEM AND METHOD FOR REDUCING OUTPUT VOLTAGE OF A POWER REGULATOR UNDER LIGHT LOAD

CROSS-REFERENCE TO RELATED APPLICATION

This application claims the benefit of U.S. Provisional Patent Application No. 61/314,409, entitled "Positive Droop with Voltage Window Control" and filed Mar. 16, 2010.

TECHNICAL FIELD

The invention relates generally to electronic circuits and, more specifically, to a system and method for regulating a power supply.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. One such type of regulator is known as a switching regulator or switching power supply, which controls the flow of power to a load by controlling the on and off duty-cycle of one or more power switches coupled to the load. Switching regulators have been implemented as an efficient mechanism for providing a regulated output in power supplies.

SUMMARY

One embodiment of the invention includes regulation voltage system for a power supply system. The system includes a current sense system configured to generate a sense signal that represents an output current of the power supply system that is supplied to a load. The system also includes a positive voltage droop controller configured to provide a regulation voltage to the power supply system, the positive voltage droop controller setting the regulation voltage to one of a predetermined fixed reference voltage or a variable reference voltage based on the sense signal. The variable reference voltage can be less than the predetermined fixed reference voltage.

Another embodiment of the invention includes a method for regulating a power supply system. The method includes supplying a regulated output voltage to a load, the output voltage being proportional to a regulation voltage and measuring a magnitude of an output current that is provided to the load. The method also includes setting a magnitude of the regulation voltage to be approximately equal to a predetermined reference voltage in response to the measured magnitude of the output current being approximately equal to or greater than a threshold current. The method further includes setting the magnitude of the regulation voltage to be less than the predetermined reference voltage in response to the measured magnitude of the output current being less than the threshold current.

Yet another embodiment of the invention includes a power supply system. The system includes a switching system configured to regulate an output voltage across a load to be proportional to a regulation voltage in response to a PWM signal and a current sense system configured to generate a sense signal that is indicative of a magnitude of an output current through the load. The system also includes a PWM system configured to generate the PWM signal in response to the output voltage, the sense signal, and the regulation voltage. The system further includes a regulation voltage control system configured to set the regulation voltage at a voltage ranging from a predetermined minimum setpoint voltage to a predetermined reference voltage based on the measured magnitude of the output current.

DETAILED DESCRIPTION

The invention relates generally to electronic circuits and, more specifically, to a system and method for regulating a power supply. A current sense system is configured to measure a magnitude of an output current that is provided to a load of a power supply system. A regulation voltage control system sets a regulation voltage based on the measured output current magnitude. For instance, the regulation voltage control system can include a positive voltage droop controller configured to set the regulation voltage to a voltage that is less than a predetermined reference voltage during light load conditions that result in a decreased output current. As described herein, a light load condition can, for example, describe a loading condition when the output load is less than half of a peak-to-peak current through an output inductor. During normal loading conditions, the regulation voltage control system can set the regulation voltage to a predetermined fixed reference voltage to achieve desired voltage regulation for the power supply. Accordingly, the regulation voltage control system can conserve power during the light load conditions, such that it can extend battery life in portable battery powered electronic device.

Figure 1:
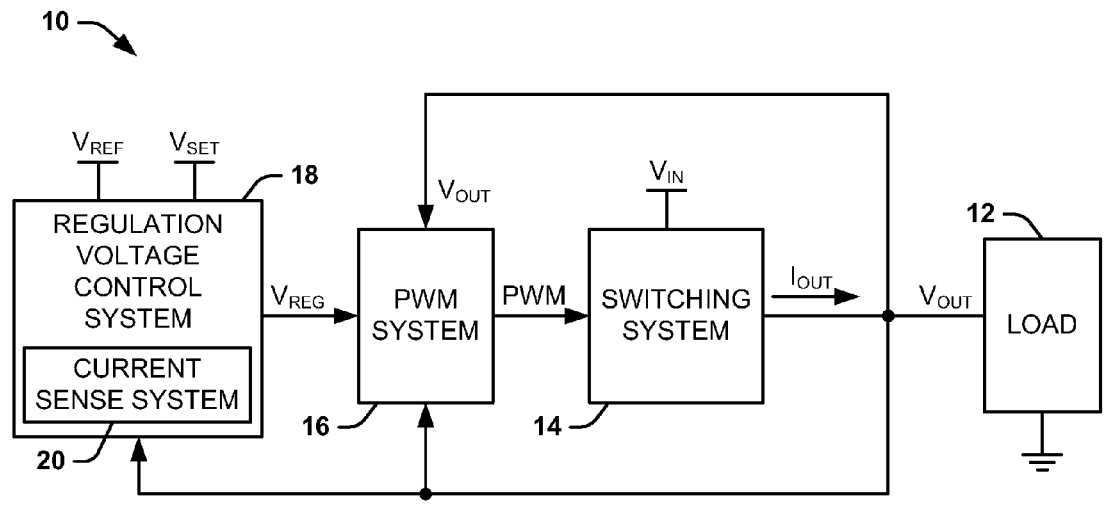
FIG. 1 illustrates an example of a power supply system in accordance with an aspect of the invention.

FIG. 1 illustrates an example of a power supply system 10 in accordance with an aspect of the invention. The power supply system 10 can be implemented in a variety of portable electronic devices, such as laptop computers or wireless communications devices. The power supply system 10 is configured to generate an output voltage $V_{OUT}$ that is supplied to a load 12. Thus, the power supply system 10 provides power to the load 12 via the output current $I_{OUT}$ and a regulated output voltage $V_{OUT}$.

The power supply system 10 includes a switching system 14 that receives an input voltage $V_{IN}$ and is configured to generate an output current $I_{OUT}$ that is provided to the load 12. The output current $I_{OUT}$ thus flows through the load 12 to set the magnitude of the output voltage $V_{OUT}$. The switching system 14 could include any of a variety of power supply circuit components arranged according to any one of a variety of different power supply topologies. As an example, the switching system 14 can be configured as a buck converter that include at least one switch, such as a high-side switch and a low-side switch, that is alternately activated at a duty-cycle to couple the input voltage $V_{IN}$ to an inductor to provide the output voltage $V_{OUT}$. Therefore, the switching system 14 is configured to regulate the output voltage $V_{OUT}$ to an approximate predetermined regulated voltage. The load 12 can also include an output capacitor that provides low-pass filtering of the output voltage $V_{OUT}$.

The power supply system 10 can also include a pulse-width modulation (PWM) system 16 that is configured to generate a signal PWM in response to the output voltage $V_{OUT}$ and a regulation voltage $V_{REG}$. The signal PWM is provided to control the switching system 14. Thus, the signal PWM can be a signal that has a duty-cycle that determines activation and deactivation of the one or more switches of the switching system 14 for the generation of the output current $I_{OUT}$, and thus the regulation of the output voltage $V_{OUT}$. As an example, the PWM system 16 can include an error amplifier and a comparator that generate the signal PWM as a substantially digital signal based on a relative magnitude of the output voltage $V_{OUT}$ and the regulation voltage $V_{REG}$. Thus, the PWM system 16 can generate the signal PWM such that the switching system 14 can regulate the output voltage $V_{OUT}$ to a magnitude that is proportional to the regulation voltage $V_{REG}$. As an example, the output voltage $V_{OUT}$ can be regulated to approximate the regulation voltage $V_{REG}$ via feedback.

As an example, the load 12 can be variable, such that the resistance magnitude of the load 12 can change during light-load (i.e., high resistance of the load 12) or heavy load (i.e., low resistance of the load 12) conditions. As a result, the magnitude of the output current $I_{OUT}$ can change based on the load 12, such that the output current $I_{OUT}$ can have a lower magnitude during a light-load condition and can have a higher magnitude during a heavy-load condition. The power supply system 10 further includes a regulation voltage control system 18 that is configured to control the regulation voltage $V_{REG}$ based on the measured magnitude of the output current $I_{OUT}$.

In the example of FIG. 1, the regulation voltage control system 18 includes a current sense system 20 that is configured to measure the magnitude of the output current $I_{OUT}$. The regulation voltage control system 18 receives a predetermined reference voltage $V_{REF}$ that can correspond to a desired DC voltage for regulation of the output voltage $V_{OUT}$. For example, the reference voltage $V_{REF}$ can correspond to a DC voltage rail, such as can be approximately 5 volts or 3.3 volts, such that the switching system 14 can regulate the output voltage $V_{OUT}$ to be approximately equal to 5 volts or 3.3 volts, respectively. However, during light-load conditions, such as can be detected based on a low magnitude of the output current $I_{OUT}$, the power supply system 10 may not be required to generate the output voltage $V_{OUT}$ at the full magnitude that is dictated by the reference voltage $V_{REF}$. For example, the power supply system 10 can be configured to generate the output voltage $V_{OUT}$ to within a predefined tolerance (e.g., +/−5% of the reference voltage $V_{REF}$). Thus, the regulation voltage control system 18 can be configured to set the magnitude of the regulation voltage $V_{REG}$ to be less than the reference voltage $V_{REF}$, such as to a variable reference voltage that is still within the tolerance but less than the reference voltage $V_{REF}$. This tolerance can vary according to application requirements and user requirements. By setting the regulation voltage $V_{REG}$ to be less than the reference voltage $V_{REF}$, the PWM system 16 and the switching system 14 collectively operate to regulate the output voltage $V_{OUT}$ at the lesser voltage during the light-load condition. Accordingly, the power supply system 10 can conserve power during light-load conditions.

In the example of FIG. 1, the regulation voltage control system 18 also receives a predetermined minimum setpoint voltage $V_{SET}$. The minimum setpoint voltage $V_{SET}$ can establish a minimum magnitude of the regulation voltage $V_{REG}$, and thus the output voltage $V_{OUT}$. For example, the minimum setpoint voltage $V_{SET}$ can establish a minimum voltage of the regulation voltage $V_{REG}$ at magnitude of zero of the output current $I_{OUT}$. Thus, the regulation voltage control system 18 can set the regulation voltage $V_{REG}$ to a positive droop voltage, which can be between the minimum setpoint voltage $V_{SET}$ and the reference voltage $V_{REF}$, based on the magnitude of the output current $I_{OUT}$ that is measured by the current sense system 20. As an example, the configuration of the regulation voltage control system 18 can define a threshold with respect to the output current $I_{OUT}$. Thus, the regulation voltage control system 18 can set the magnitude of the regulation voltage $V_{REG}$ to be approximately equal to the reference voltage $V_{REF}$ if the output current $I_{OUT}$ is approximately equal to or greater than the threshold, and can set the magnitude of the regulation voltage $V_{REG}$ to the positive droop voltage that is less than the reference voltage $V_{REF}$ if the output current $I_{OUT}$ is less than the threshold. The lower voltage, which is referred to herein as the positive droop voltage, can be variable or it can be fixed.

Figure 2:
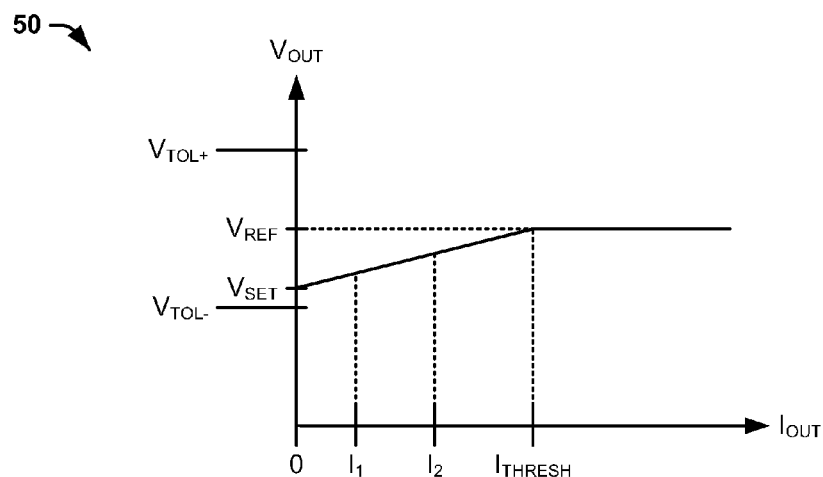
FIG. 2 illustrates an example of a graph of voltage versus current in accordance with an aspect of the invention.

FIG. 2 illustrates an example of a graph 50 of voltage versus current in accordance with an aspect of the invention. For example, the graph 50 demonstrates the output voltage $V_{OUT}$ plotted as a function of the output current $I_{OUT}$. Reference can be made to the example of FIG. 1 in the following description of FIG. 2. The output voltage $V_{OUT}$ is set according to the regulation voltage $V_{REG}$, such as shown and described herein.

In the example of FIG. 2, four voltage magnitudes are demonstrated: the predetermined reference voltage $V_{REF}$, the minimum setpoint voltage $V_{SET}$, and tolerance voltages $V_{TOL+}$ and $V_{TOL-}$. As an example, the tolerance voltages $V_{TOL+}$ and $V_{TOL-}$ can collectively represent a predefined tolerance range within which the output voltage $V_{OUT}$ is generated, such as can be established according to application requirements or user requirements. For example, the tolerance voltage $V_{TOL+}$ can be a voltage having a magnitude that is approximately 5% greater than the reference voltage $V_{REF}$ and the tolerance voltage $V_{TOL-}$ can be a voltage having a magnitude that is approximately 5% less than the reference voltage $V_{REF}$. As an example, the reference voltage $V_{REF}$ can be selected to have a magnitude of approximately 5 volts. Thus, in this example, the tolerance voltages $V_{TOL+}$ and $V_{TOL-}$ can have magnitudes of 5.25 volts and 4.75 volts, respectively.

In the example of FIG. 1, the minimum setpoint voltage $V_{SET}$ has a magnitude that is greater than the tolerance voltage $V_{TOL-}$ by a small amount. Continuing with the above example, assuming $V_{TOL-}$ is 4.75 volts, the minimum setpoint voltage $V_{SET}$ can be approximately 4.8 volts. In the example of FIG. 2, the output voltage $V_{OUT}$ thus has a substantially linear range of magnitudes between the minimum setpoint voltage $V_{SET}$ at zero amps of the output current $I_{OUT}$ and the reference voltage $V_{REF}$ at a magnitude of the output current $I_{OUT}$ that is greater than and equal to a threshold $I_{THRESH}$. Thus, upon the output current $I_{OUT}$ having a magnitude that is greater than or equal to the threshold $I_{THRESH}$, the output voltage $V_{OUT}$ is regulated to the predetermined reference voltage $V_{REF}$. However, if the output current $I_{OUT}$ having a magnitude that is less than the threshold $I_{THRESH}$, such as during a light-load condition, the output voltage $V_{OUT}$ is regulated by the power supply system 10 to a variable reference voltage that is less than the reference voltage $V_{REF}$. As an example, the variable reference voltage can correspond to a variable positive droop voltage. The threshold $I_{THRESH}$ can be set according to application requirements and may be programmable, such as based on a programmable magnitude of the minimum setpoint voltage $V_{SET}$ and an associated slope resistor, as described herein.

For a light load condition when $I_{OUT}$ is less than $I_{THRESH}$, the example of FIG. 2 demonstrates the output voltage being regulated to a variable positive droop voltage. The positive droop voltage is shown as increasing from the minimum setpoint voltage $V_{SET}$ to the predetermined reference voltage $V_{REF}$. As an example, a magnitude $I_1$ can be approximately 0.5 amps and $I_2$ can be approximately 1 amp. Thus, the power supply system 10 can regulate the output voltage to a magnitude that is approximately equal to 4.85 volts for $I_{OUT}=I_1$. As a result, the power supply system 10 consumes approximately 2.425 watts at the magnitude $I_1$ of the output current $I_{OUT}$ instead of 2.5 watts if the output voltage $V_{OUT}$ was regulated at 5 volts. Accordingly, the power supply system 10 achieves a power saving of approximately 75 milliwatts by regulating the output voltage $V_{OUT}$ to a magnitude that is less than the reference voltage $V_{REF}$ during the light-load condition. As another example, FIG. 2 demonstrates a magnitude $I_2$ of the output current $I_{OUT}$, which can be approximately 1 amp. Thus, the power supply system 10 can regulate the output voltage to a magnitude that is approximately equal to 4.9 volts. As a result, the power supply system 10 consumes approximately 4.9 watts at the magnitude $I_2$ of the output current $I_{OUT}$ instead of 5 watts if the output voltage $V_{OUT}$ was regulated at 5 volts, thus achieving a power saving of approximately 100 milliwatts.

Figure 3:
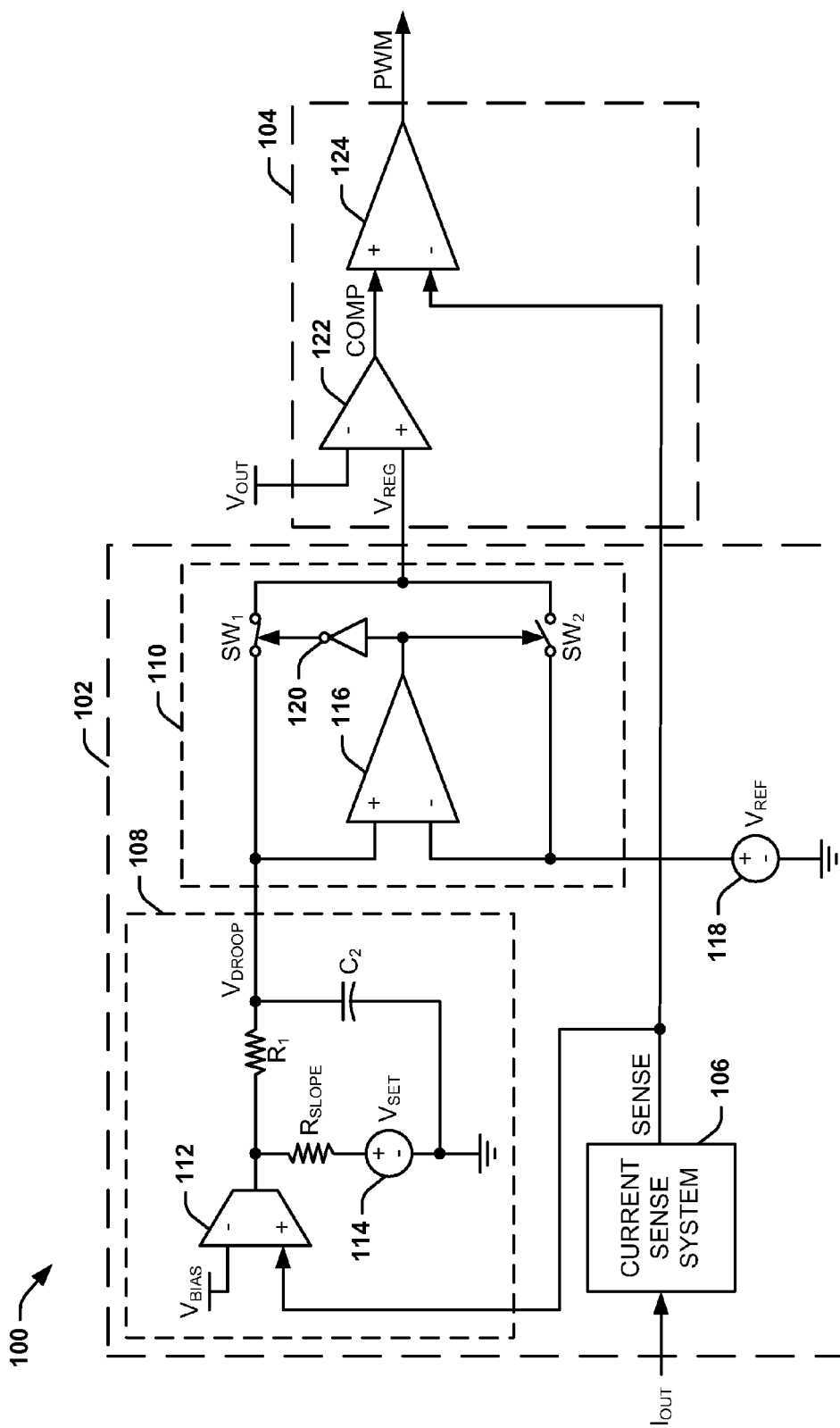
FIG. 3 illustrates another example of a power supply system in accordance with an aspect of the invention.

FIG. 3 illustrates another example of a power supply system 100 in accordance with an aspect of the invention. The power supply system 100 includes a regulation voltage control system 102 and a PWM system 104. The regulation voltage control system 102 is configured to generate the regulation voltage $V_{REG}$, such as corresponding to the positive voltage droop controller 18 in the example of FIG. 1. Reference can be made to the examples of FIGS. 1 and 2 in the following description of the example of FIG. 3. As an example, at least one of the regulation voltage control system 102 and the PWM system 104 can be included in or implemented as a portion of an integrated circuit (IC).

The regulation voltage control system 102 includes a current sense system 106, a positive voltage droop controller 108, and a selector 110. The current sense system 106 is configured to measure a magnitude of the output current $I_{OUT}$. As an example, the current sense system 106 can include one or more of a precision sense resistor, circuitry to measure a DC resistance of an associated output inductor, an on-resistance of an associated output switch, or current through any of a variety of other devices. The current sense system 106 thus generates a sense signal SENSE. The sense signal SENSE can have a value (e.g., a voltage magnitude or digital value) that is indicative of the measured magnitude of the output current $I_{OUT}$.

The positive voltage droop controller 108 includes a transconductance amplifier 112 that is configured to provide a current sense signal. For instance, the transconductance amplifier 112 generates the current sense signal at an associated output based on a voltage difference between the bias voltage $V_{BIAS}$ and the SENSE voltage signal. Because the input sense signal SENSE has a voltage magnitude corresponding to the output current $I_{OUT}$ and is referenced to the bias voltage $V_{BIAS}$, the difference between such signals results in the current sense signal being proportional to (e.g., equal to) the magnitude of the output current $I_{OUT}$. The positive voltage droop controller 108 also includes a setpoint voltage supply 114 that generates the minimum setpoint voltage $V_{SET}$. As an example, the setpoint voltage supply 114 is demonstrated in the example of FIG. 3 as diagrammatically, such that the setpoint voltage supply 114 could correspond to an external pin on an associated IC that is provided with the minimum setpoint voltage $V_{SET}$.

The setpoint voltage supply 114 is separated from the output of the transconductance amplifier 112 by a resistor $R_{SLOPE}$. The resistor $R_{SLOPE}$ can have a resistance magnitude that is selected to set the slope of the slope of the positive droop voltage $V_{DROOP}$, such as to regulate the output voltage $V_{OUT}$ to a substantially linear range of magnitudes of between the minimum setpoint voltage $V_{SET}$ and the reference voltage $V_{REF}$, similar to as demonstrated in the example of FIG. 2. The transconductance amplifier 112 provides an output based on the sensed current signal (according to the SENSE signal) relative to a bias voltage $V_{BIAS}$. The positive voltage droop controller 108 thus can be configured to provide the positive droop voltage $V_{DROOP}$ with magnitude that varies as a function of the output current $I_{OUT}$. The resistor $R_1$ is also connected with a capacitor $C_2$ (e.g., corresponding to a low-pass filter) to provide a time constant for providing the positive droop voltage $V_{DROOP}$ to the selector 110. The time constant of the low-pass filter having can be much greater than a time constant of the regulation loop associated with the PWM system 104. Therefore, the low-pass filter of $R_1$ and $C_2$ can be configured to ensure stability of the power supply system 100 when regulating during light load conditions in response to the positive droop voltage $V_{DROOP}$. As another example, the positive voltage droop controller 108 could instead be configured to include hysteresis or a counter to substantially mitigate instability in the power supply system 100 in response to the positive droop voltage $V_{DROOP}$. Thus, those skilled in the art will appreciate various types of stabilization components (e.g., the LP filter of $R_1$ and $C_2$, circuitry to provide hysteresis, a counter or the like) that can be utilized (e.g., as positive feedback) to ensure system stability in response to regulation via the positive droop voltage $V_{DROOP}$ during light load conditions.

In the example of FIG. 3, the selector circuit 110 includes a comparator 116. The positive droop voltage $V_{DROOP}$ is provided to a non-inverting input of the comparator 116 and the predetermined DC reference voltage $V_{REF}$ is provided to an inverting input of the comparator 116. The reference voltage $V_{REF}$ is demonstrated as generated by a voltage supply 118, but it is to be understood that the voltage supply 118 could correspond to an external pin on the associated IC that is provided with the reference voltage $V_{REF}$. Therefore, the comparator 116 is configured to compare the magnitude of the positive droop voltage $V_{DROOP}$ with the reference voltage $V_{REF}$. If the reference voltage $V_{REF}$ is greater than the positive droop voltage $V_{DROOP}$, such as during a light-load condition (e.g., based on the magnitude of the output current $I_{OUT}$ being less than a current threshold), the comparator 116 is configured to activate a switch SW$_1$ via an inverter 120 to set the magnitude of the regulation voltage $V_{REG}$ to be approximately equal to the positive droop voltage $V_{DROOP}$. That is, the positive droop voltage $V_{DROOP}$ is connected to the output of the regulation voltage control system 102 to provide the regulation voltage $V_{REG}$ via the switch SW$_1$. In contrast, if the positive droop voltage $V_{DROOP}$ is greater than or equal to the reference voltage $V_{REF}$, such as during normal operation (e.g., based on the magnitude of the output current $I_{OUT}$ being greater than the threshold), the comparator 116 is configured to activate a switch SW$_2$ to set the regulation voltage $V_{REG}$ to the reference voltage $V_{REF}$. As shown and described with respect to FIG. 2, the regulation voltage control system 102 can be configured to set the threshold $I_{THRESH}$, such as based on the difference in magnitude between the minimum setpoint voltage $V_{SET}$ and the reference voltage $V_{REF}$, as well as the slope based on the resistance of the resistor $R_{SLOPE}$.

The PWM system 104 includes an error amplifier 122 that generates a signal COMP that is based on a difference in magnitude between the output voltage $V_{OUT}$ and the regulation voltage $V_{REG}$ that is provided by the regulation voltage control system 102. The PWM system 104 also includes a PWM comparator 124 that is configured to compare the magnitudes of the signal COMP and the sense signal SENSE to generate the signal PWM. Thus, the PWM system 104 is configured to set a duty-cycle of the signal PWM to activate the one or more switches of the switching system 14 to regulate the magnitude of the output voltage $V_{OUT}$ based on the regulation voltage, such as for implementing current mode control (e.g., in a constant on-time current mode power supply system). Furthermore, based on the regulation voltage control system 102 setting the magnitude of the regulation voltage $V_{REG}$ to the positive droop voltage $V_{DROOP}$ that is less than the reference voltage $V_{REF}$ during light-load conditions, the power supply system 100 can regulate the output voltage $V_{OUT}$ to a reduced magnitude during the light-load conditions to conserve power.

It is to be understood that the power supply system 100 is not intended to be limited to the example of FIG. 3. As an example, the positive voltage droop controller 108 is not limited to generating the positive droop voltage $V_{DROOP}$ to have the substantially linear range of values with a positive slope less than the reference voltage $V_{REF}$, but could instead have a non-linear range of magnitudes or could be a static magnitude (i.e., zero slope) less than the reference voltage $V_{REF}$. As another example, in the example of FIG. 3, the output voltage $V_{OUT}$ is regulated to be approximately equal to the regulation voltage $V_{REG}$. However, it is to be understood that the regulation voltage $V_{REG}$ and the output voltage $V_{OUT}$ can be proportional with respect to each other, as opposed to being equal. For example, the output voltage $V_{OUT}$ can be provided as a feedback voltage that is voltage divided from the output voltage, and/or the regulation voltage $V_{REG}$ could be set as proportional to one or both of the reference voltage $V_{REF}$ and the positive droop voltage $V_{DROOP}$.

Figure 4:
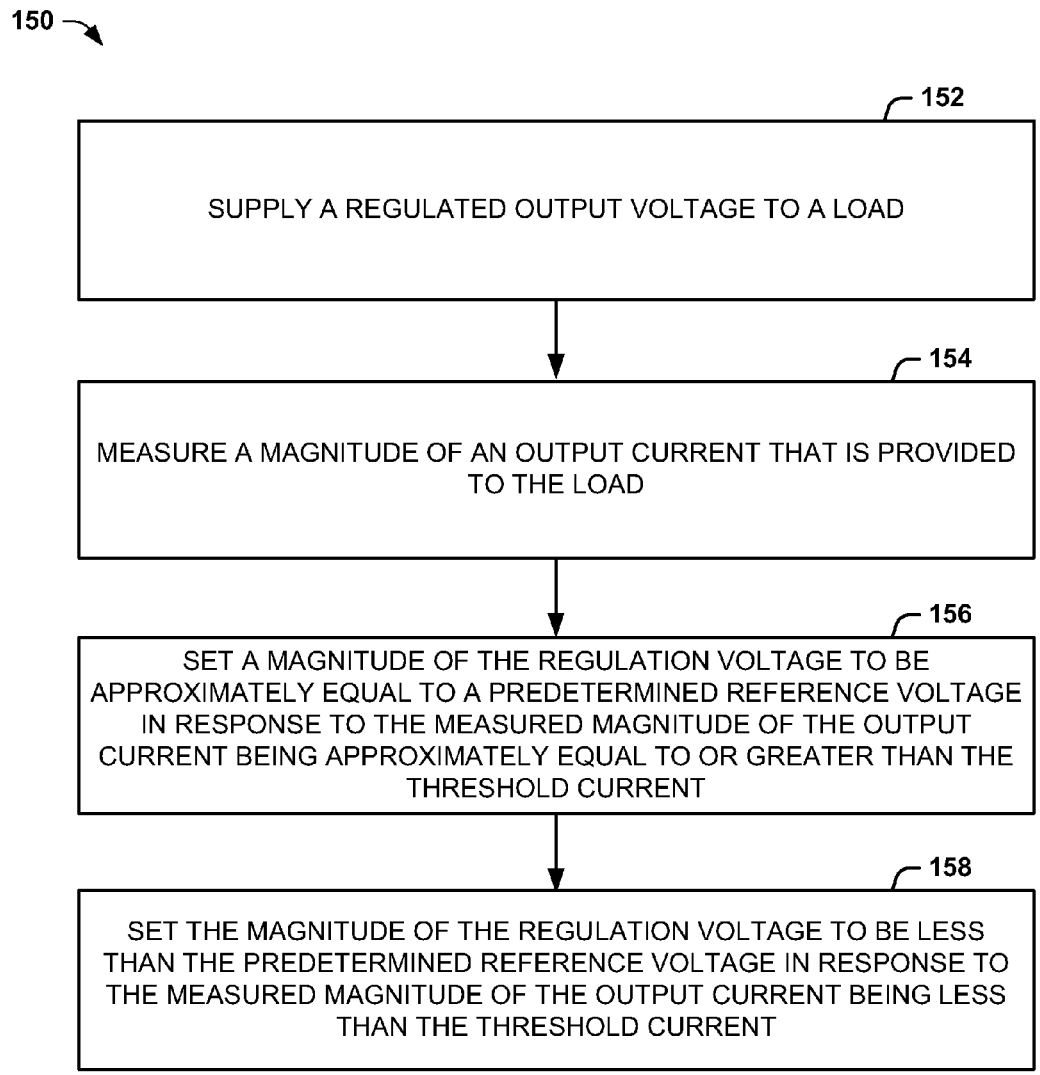
FIG. 4 illustrates an example of a method for regulating a power supply system in accordance with an aspect of the invention.

In view of the foregoing structural and functional features described above, a methodology in accordance with various aspects of the invention will be better appreciated with reference to FIG. 4. While, for purposes of simplicity of explanation, the methodology of FIG. 4 is shown and described as executing serially, it is to be understood and appreciated that the invention is not limited by the illustrated order, as some aspects could, in accordance with the invention, occur in different orders and/or concurrently with other aspects from that shown and described herein. Moreover, not all illustrated features may be required to implement a methodology in accordance with an aspect of the invention.

FIG. 4 illustrates an example of a method 150 for regulating a power supply system in accordance with an aspect of the invention. At 152, a regulated output voltage is supplied to a load. For example, the output voltage can be proportional to a regulation voltage ($V_{REG}$), such as in response to a pulse-width modulation (PWM) signal. The PWM signal can have a duty-cycle that activates and deactivates one or more switches of a switching system to generate an output current, such as through an inductor, to set the magnitude of the output voltage. At 154, a magnitude of an output current that is provided to the load is measured. The measuring can be based, for example, on a precision sense resistor, a DC resistance of an associated output inductor, an on-resistance of an associated output switch, or a current through any of a variety of other devices.

At 156, a magnitude of the regulation voltage is set to be approximately equal to a predetermined reference voltage in response to the measured magnitude of the output current being approximately equal to or greater than a threshold current. The reference voltage can be a voltage to which the output voltage is regulated during heavy-load conditions. The setting of the magnitude can be based on a comparator that compares a positive droop voltage having a magnitude that varies based on the output current. At 158, the magnitude of the regulation voltage is set to be less than the predetermined reference voltage in response to the measured magnitude of the output current being less than the threshold current.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A regulation voltage system for a power supply system comprising:
a current sense system configured to generate a sense signal that represents an output current of the power supply system that is supplied to a load; and
a positive voltage droop controller configured to provide a regulation voltage to the power supply system, the positive voltage droop controller setting the regulation voltage to one of a predetermined fixed reference voltage or a variable reference voltage based on the sense signal, the variable reference voltage being less than the predetermined fixed reference voltage, wherein the positive droop controller generates a variable positive droop voltage that increases as a function of the output current from approximately a predetermined minimum setpoint voltage to approximately the predetermined reference voltage when the output current is approximately equal to a threshold current, wherein setting a magnitude of the regulation voltage to be less than the predetermined reference voltage comprises setting the magnitude of the regulation voltage to approximately the positive droop voltage.

2. The system of claim 1, wherein the positive voltage droop controller comprises a slope resistor, and wherein the threshold current is based on a difference between the predetermined fixed reference voltage and the predetermined minimum setpoint voltage, as well as a rate of change in the variable reference voltage between the predetermined fixed reference voltage and the predetermined minimum setpoint voltage that is based on a resistance of the slope resistor.

3. The system of claim 1, wherein the threshold is programmable.

4. The system of claim 1, wherein the positive voltage droop controller comprises:
a transconductance amplifier configured to generate a positive droop voltage corresponding to the variable reference voltage based on a magnitude of the sense signal; and
a resistor interconnecting an output of the transconductance amplifier and the predetermined minimum setpoint voltage that sets a slope of the variable reference voltage as a function of the output current.

5. The system of claim 4, further comprising a selector comprising a comparator configured to compare the positive droop voltage with the predetermined fixed reference voltage and to activate a first switch to set the regulation voltage to be approximately equal to the positive droop voltage in response to the positive droop voltage being less than the predetermined fixed reference voltage and to activate a second switch to set the regulation voltage to be approximately equal to the predetermined fixed reference voltage in response to the positive droop voltage being greater than the predetermined fixed reference voltage.

6. The system of claim 4, wherein the positive voltage droop controller further comprises a stabilization component configured to substantially stabilize the regulation voltage system in response to the positive droop voltage.

7. The system of claim 1, wherein the predetermined minimum setpoint voltage is within a predetermined tolerance of the predetermined fixed reference voltage that is established for regulating an output voltage.

8. An integrated circuit comprising at least a portion of the regulation voltage system of claim 1.

9. A method for regulating a power supply system, the method comprising:
supplying a regulated output voltage to a load, the regulated output voltage being proportional to a regulation voltage;
measuring a magnitude of an output current that is provided to the load;
setting a magnitude of the regulation voltage to be approximately equal to a predetermined reference voltage in response to the measured magnitude of the output current being approximately equal to or greater than a threshold current; and
setting the magnitude of the regulation voltage to be less than the predetermined reference voltage in response to the measured magnitude of the output current being less than the threshold current;
generating a variable positive droop voltage that increases as a function of the output current from approximately a predetermined minimum setpoint voltage to approximately the predetermined reference voltage when the output current is approximately equal to a threshold current, wherein setting a magnitude of the regulation voltage to be less than the predetermined reference voltage comprises setting the magnitude of the regulation voltage to approximately the positive droop voltage.

10. The method of claim 9, wherein the positive droop voltage has a positive slope, the method further comprising setting the slope of the positive droop voltage based on a resistance value of a slope resistor.

11. The method of claim 9, wherein generating the positive droop voltage comprises generating the positive droop voltage based on the measured magnitude of the output current and the predetermined minimum setpoint voltage.

12. The method of claim 9, further comprising:
comparing the positive droop voltage with the predetermined reference voltage;
switching the regulation voltage to the positive droop voltage in response to the positive droop voltage being less than the predetermined reference voltage; and
switching the regulation voltage to the predetermined reference voltage in response to the positive droop voltage being greater than or equal to the predetermined reference voltage.

13. The method of claim 9, further comprising selecting a magnitude of the predetermined minimum setpoint voltage to within a predetermined tolerance of the predetermined reference voltage that is established for regulating the regulated output voltage.

14. A power supply system comprising:
a switching system configured to regulate an output voltage to a load to be proportional to a regulation voltage in response to a pulse-width modulation (PWM) signal;
a current sense system configured to generate a sense signal that is indicative of a magnitude of an output current provided to the load;
a PWM system configured to generate the PWM signal in response to the output voltage, the sense signal, and the regulation voltage; and
a regulation voltage control system configured to set the regulation voltage at a voltage ranging from a predetermined minimum setpoint voltage to a predetermined reference voltage based on the magnitude of the output current;
a positive droop controller generating a variable positive droop voltage that increases as a function of the output current from approximately a predetermined minimum setpoint voltage to approximately the predetermined reference voltage when the output current is approximately equal to a threshold current, wherein setting a magnitude of the regulation voltage to be less than the predetermined reference voltage comprises setting the magnitude of the regulation voltage to approximately the positive droop voltage.

15. The system of claim 14, wherein the regulation voltage control system is configured to set the regulation voltage to the predetermined reference voltage in response to the magnitude of the output current being approximately equal to or greater than the threshold current and is configured to set the regulation voltage to the variable positive droop voltage that is between the predetermined minimum setpoint voltage and the predetermined reference voltage.

16. The system of claim 14, wherein the regulation voltage control system comprises a slope resistor configured to set a slope of the variable positive droop voltage.

17. The system of claim 14, wherein the regulation voltage control system comprises:
a transconductance amplifier configured to generate the positive droop voltage based on the sense signal, the variable positive droop voltage increasing linearly in a range from the predetermined minimum setpoint voltage to approximately the predetermined reference voltage; and
a comparator configured to compare the positive droop voltage with the predetermined reference voltage and to set the regulation voltage to the positive droop voltage in response to the positive droop voltage being less than the predetermined reference voltage and to set the regulation voltage to the predetermined reference voltage in response to the positive droop voltage being greater than the predetermined reference voltage.

* * * * *